United States Patent

Guglielmo

[11] 3,902,088
[45] Aug. 26, 1975

[54] BRUSH HOLDER DEVICES

[75] Inventor: Jean Guglielmo, Caluire, France

[73] Assignee: Lucien Ferraz & Cie., Lyon, France

[22] Filed: Jan. 25, 1974

[21] Appl. No.: 436,636

[30] Foreign Application Priority Data
Feb. 8, 1973 France............................ 73.05256

[52] U.S. Cl. ............................................. 310/246
[51] Int. Cl.² .......................................... H02K 13/00
[58] Field of Search .......... 310/238, 219, 239, 229, 310/240, 230, 241, 231, 242, 244, 245, 246, 247, 249

[56] References Cited
UNITED STATES PATENTS

| | | | |
|---|---|---|---|
| 2,935,632 | 5/1960 | Schmitz | 310/249 |
| 3,010,042 | 11/1961 | Moore | 310/246 |
| 3,022,434 | 2/1962 | Kester | 310/246 |
| 3,099,761 | 7/1963 | Gutherlet | 310/246 |
| 3,146,365 | 8/1964 | Millar | 310/246 |
| 3,387,155 | 6/1968 | Krulls | 310/239 |
| 3,423,618 | 1/1969 | Schmid | 310/240 |
| 3,518,475 | 6/1970 | Sebok | 310/249 |
| 3,590,299 | 6/1971 | Wiggs | 310/246 |
| 3,634,710 | 1/1972 | Woda | 310/239 |

FOREIGN PATENTS OR APPLICATIONS
1,070,857  6/1967  United Kingdom........... 310/239

*Primary Examiner*—R. Skudy
*Attorney, Agent, or Firm*—Dowell & Dowell

[57] ABSTRACT

In a brush-holder wherein the brush is urged against the commutator, slip-ring or like rotary member by a spring formed of a self-coiling metallic ribbon, the end of the ribbon is attached to the outer end of the brush, its substantially straight uncoiled portion extends along one lateral sides of the brush in a plane substantially radial to the rotary member, and its coiled portion or loop bears slidably against an insulated resting surface to urge the brush inwardly, the said resting surface being at such an angle to the brush axis that it generates a transverse component which applies the coiled portion against the brush and thus presses the latter laterally against one of its guiding walls in close proximity to its inner end. The tendency of the brush to rock within its guides in the case of a reversible machine may thus be eliminated.

7 Claims, 9 Drawing Figures

BRUSH HOLDER DEVICES

The present invention relates to brush-holder devices for rotary electric machines. In such brush-holders the brush is generally slidably guided in appropriate guides and it is submitted to the action of a spring whereby it is pressed against the corresponding rotating member (commutator or slip ring). Owing to the unavoidable tolerances the brush is guided with a noticeable lateral clearance and therefore it can rock slightly in the brush-holder. This is an important inconvenience, more particularly in the case of reversible machines, since the bearing surface of the brush is no more the same for both directions.

It has been proposed to avoid this disadvantage by maintaining the brush against one of the lateral guiding walls in the brush-holder casing. For instance, when the brush pressing spring is in the form of a resilient metallic ribbon which tends to coil on itself, its coiled portion or loop acting on the outer end of the brush, this end is generally at an angle to the axis of the brush in order to create a transverse component which urges the brush against one of the lateral walls of its guide. But this component acts on the outer end of the brush and the specific pressure of the latter against the said wall decreases from this outer end to its inner end where it is quite small. In actual practice, this arrangement reduces the vibrations of the brush in a non-reversible machine but in a reversible machine it does not eliminate the undesirable rocking movement of the brush in its guide when the direction of rotation is reversed.

A number of other devices have been proposed for obtaining a uniform pressure of the brush against one of its guiding walls in the brush-holder casing, but they comprise additional parts which increase the manufacturing cost.

The present invention has for its object to provide a brush-holder device of simple construction wherein the brush is pressed against one of its guiding walls with a specific pressure which is at a maximum in the vicinity of the inner end of the brush.

In accordance with the present invention in a brush-holder device for a rotary electric machine, of the type comprising for each brush a spring formed of a resilient metallic self-coiling ribbon, the outer end of the spring is secured to the outer end of the brush, its uncoiled portion extending along one of the sides of the said brush, while its coiled portion or loop takes rest against a resting surface disposed in the vicinity of the inner end of the brush-holder casing and which is at such an angle to the brush axis that the said coiled portion or loop is urged laterally against the brush.

The outer end of the spring is preferably secured to the outer end of the brush in a non-detachable manner so that the brush and the spring form a single interchangeable unit.

Conveniently the resting surface is formed of a section of a substantially rigid blade fixed to the brush-holder casing and which is so shaped as to define, in combination with the adjacent lateral side of the brush a space in which the coiled portion or loop of the spring is disposed, the adjacent lateral wall of the brush-holder casing having an opening in front of this space for passage of the said coiled portion or loop.

In a modified embodiment the resting surface may be part of a removable unit adapted to be introduced into the brush-holder casing through the outer end thereof and to be retained therein, the adjacent wall of the said casing having an opening for passage of the coiled portion or loop of the spring.

The removable unit conveniently comprises a substantially rigid blade having a section so disposed as to form the resting surface, and a lateral resilient blade so shaped as to form a spring clip in cooperation with a corresponding stop carried by the brush-holder casing, the latter having abutment means adapted to retain the said removable unit laterally against the action of the spring.

The removable unit may be in the form of a V, the substantially rigid blade forming one branch thereof and the resilient blade the other one, while the said abutment means include a pin disposed between the said branches adjacent the outer end of the brush-holder casing, in such manner that the said removable unit may be retained pivotally attached to the casing when it has been pulled outwardly and rocked laterally for disengaging the spring.

In all the above-mentioned embodiments the resting surface is preferably covered by an insulating and friction reducing layer.

Figure 1:
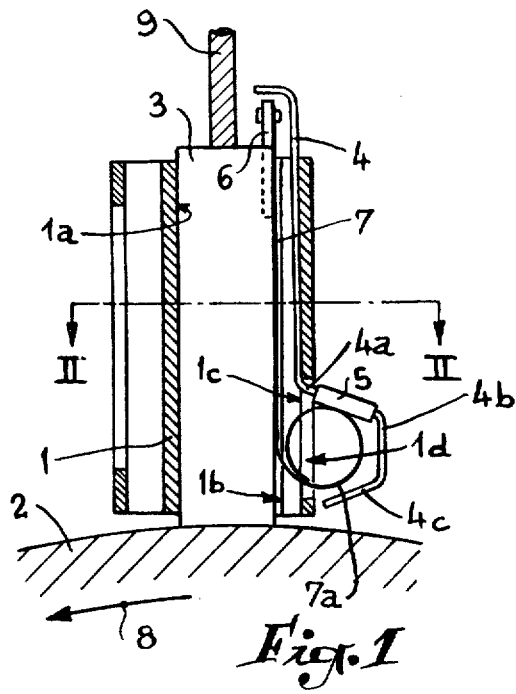
FIG. 1 is a section of a brush-holder device according to the present invention, the plane of section being perpendicular to the commutator, slip-ring or like rotary member.
Figure 5:
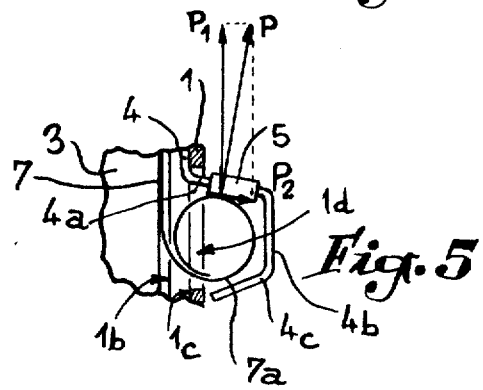

FIG. 5 diagrammatically reproduces a portion of FIG. 1, but with the resting surface for the spring being at another angle to the brush axis.

Figure 6:
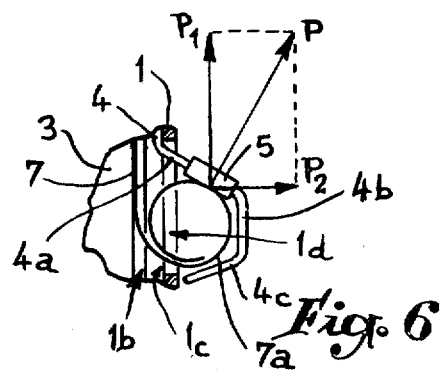

FIGS. 5 and 6 are diagrams showing the resting surface for the spring at two different angles to the brush axis and illustrating the lateral components obtained.

Figure 7:
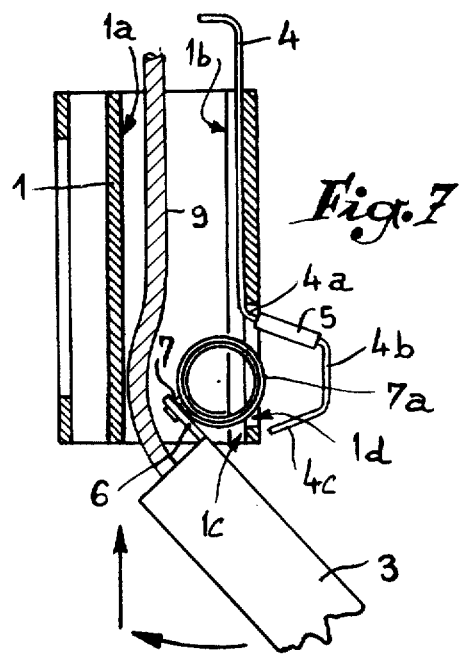

FIG. 7 shows how the brush-and-spring unit may be introduced into the brush-holder casaing in a device according to FIG. 1.

Figure 8:
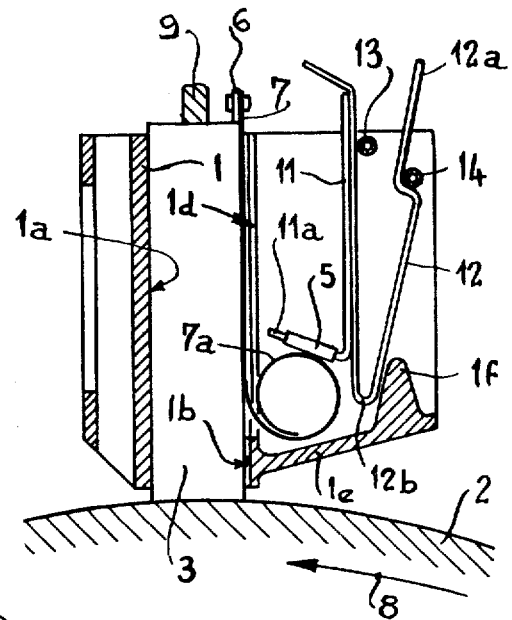

FIG. 8 is a section illustrating a modified embodiment of a brush-holder device according to the invention.

Figure 9:
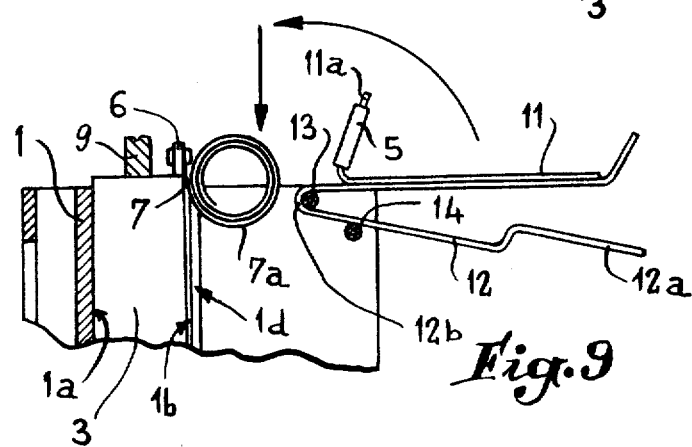

FIG. 9 reproduces the upper portion of FIG. 8, but with the removable spring retaining unit pulled outwardly and rocked laterally.

Figure 2:
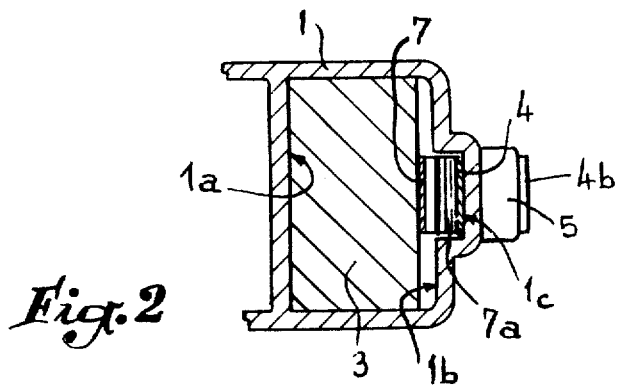
FIG. 2 is a transverse section taken along line II—II of FIG. 1.

In FIGS. 1 and 2 reference numeral 1 designates the casing of a brush-holder and reference numeral 2 the corresponding rotating member (commutator or slip ring). A brush 3 is slidably mounted in this casing 1 so as to come into contact with member 2. In the plane of FIG. 1, i. e., in a plane transverse to the rotating member 2, this brush has a noticeable clearance between the opposed guiding walls 1a and 1b of the casing. As shown the second wall 1b is formed with a flat longitudinal groove 1c in which a substantially rigid metallic blade 4 is fixed by appropriate means not illustrated. In the immediate vicinity of the inner end of casing 1 adjacent to the rotating member 2, the bottom of this groove 1c has an opening 1d which receives the lower or inner portion of the blade 4, this portion comprising a first section which extends obliquely through the said opening towards member 2, a second section 4b substantially parallel to the axis of the brush 3, and a third section 4c which extends obliquely towards member 2 as section 4a, but in the reverse direction. The first section 4a carries a covering sleeve 5 made of an insulating substance having a low coefficient of friction such as a polyamid or a polytetrafluoroethylene.

Figure 3:
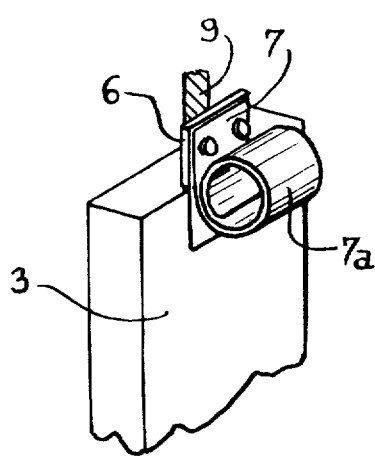
FIG. 3 is a fragmental perspective view illustrating the outer end of the brush.

The brush 3 carries at its outer end, remote from the rotating member 2, a small metallic plate 6 (see also FIG. 3) disposed in a depression provided in the sides of the brush which faces the guiding wall 1c and secured to the brush in any appropriate manner, not shown. A spring 7 formed in the per se known manner of a resilient metallic ribbon which tends to coil on itself with a substantially constant elastic reaction, has its outer end rivetted to the small plate 6. This strip comprises a substantially straight portion which extends against the aforesaid side of the brush 3, while its coiled portion or loop 7a projects through the opening 1d into the space delimited by the three sections 4a, 4b, 4c of the blade 4. As illustrated in FIGS. 2 and 3, the resilient ribbon 7 has a width which is considerably less than that of the brush and which corresponds substantially to the width of the groove 1c.

Figure 4:
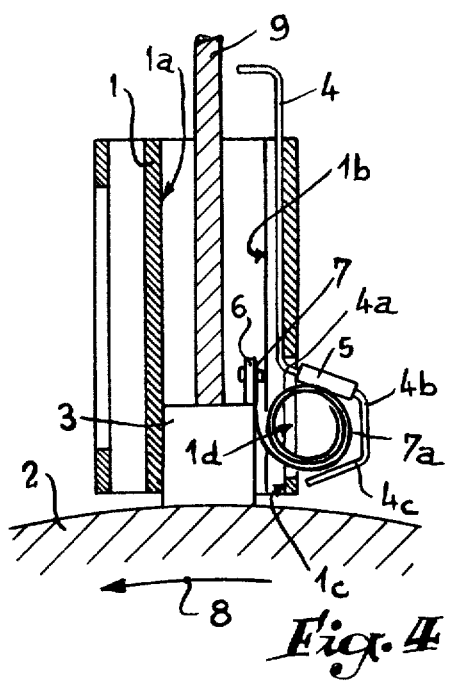
FIG. 4 is a view similar to FIG. 1, but showing the brush almost wholly worn out.

Under the effect of the reaction of the spring 7, the coiled portion or loop 7a thereof bears against the sleeve 5 and its outer end secured to the small plate 6 is urged inwardly (downwardly in FIG. 1). The brush 3 is thus applied against the rotating member 2. Since the reaction of the spring is constant, the pressure of this brush on the said rotating member is also constant during the whole useful life of the brush, i. e., until the latter is worn out (position illustrated in FIG. 4). But owing to the obliquity of the section 4a which carries the sleeve 5, the pressure P (FIGS. 5 and 6) which the loop 7a exerts on the said sleeve is not parallel to the axis of the brush and it may be resolved into a longitudinal component P1 parallel to the said axis and a transverse component P2 perpendicular to the latter. Due to this transverse component P2, the coiled portion or loop 7a is urged towards the brush to which it transmits a pressure equal and opposed to the said component P2. This pressure maintains the brush applied against the opposed guiding wall 1a of the brush-holder casing 1. This action is somewhat similar to what is obtained with the conventional arrangement wherein the coiled portion of a spring of the kind in question acts on the outer end of a brush, but here the transverse pressure is applied to the brush close to its inner end and not at its outer end, and it may therefore prevent any tendency of the brush to rock in its guides under the action of frictional forces acting on its inner end. When the rotating member 2 rotates in the direction indicated by the arrow 8 these frictional forces tend to apply uniformly the brush against the guiding wall 1a, but if the direction of rotation is reversed, the pressure exerted by the loop 7a may be sufficient to maintain the brush against the said wall if the angle of obliquity of section 4a has been properly selected. FIGS. 5 and 6 clearly show that the transverse component P2 increases as the angle of obliquity of section 4a.

The arrangement described further affords two other important advantages over the conventional devices.

The first advantage is that the outer end of the brush is not in part covered by the coiled portion or loop of the spring and that it may therefore freely receive the usual flexible connecting conductors such as 9 which may be disposed centrally without any risk of interfering with the spring.

Another advantage is that if the spring breaks, its coiled portion 7a is retained between sections 4a, 4b, 4c and is no more liable to fall into the machine.

FIG. 7 shows how the brush-and-spring unit 3 – 6 – 7 – 9 illustrated in FIG. 3 may be mounted in position in the brushholder casing. The latter is first disengaged from the rotating member in any appropriate manner and the said unit is introduced obliquely into the lower or inner end of the casing, in order that the coiled portion or loop 7a may pass laterally through the opening 1d. The brush is then brought to a position co-axial with respect to the longitudinal space defined by the facing walls 1a and 1b and it is pushed upwardly into this space. The brush-holder casing 1 is thereafter returned to its operating position with respect to the rotating member 2.

The role of the sleeve 5 is to prevent any flow of electric current between the casing and the spring, as for instance in the case of a defective connection through the conductor 9. Furthermore this sleeve reduces to a noticeable extent the frictional resistances. It may however be suppressed if desired.

In the embodiment of FIG. 8 the brush-holder device is arranged in such manner that the brush-and-spring unit 6–7–9 may be mounted in the brush-holder casing 1 through the outer end of this casing, without having to disengage the latter from the rotating member 2. In this embodiment the casing 1 is formed with a lower wall 1e which plays the same role as the section 4c of FIGS. 1–7, i. e., which closes the lower end of the space adapted to receive the wound portion or loop 7a of the spring 7. The oblique resting surface which carries the insulating sleeve 5 is here formed by the bent end 11a of a substantially rigid blade 11 secured by welding or soldering to the first branch of a V-shaped resilient blade 12. This first branch rests against a transverse pin 13 carried by the brush-holder casing 1 while the second branch has its outer end 12a connected with the remainder of the branch by an intermediate portion bent twice at 90° in such manner as to form an outwardly protruding tooth which bears against another transverse pin 14 of casing 1. The apex portion 12b of member 12 is located close to the loop 7a in order to act as the section 4c of FIG. 1, i. e., to form the lateral wall of the space in which the said loop 7a is disposed. This apex portion 12b rests against an inner boss 1f of the aforesaid wall 1e.

The opening 1d extends to the outer end of the guiding wall 1b. In other words this opening becomes a longitudinal slot.

At the position illustrated in FIG. 8, the unit formed by the rigid blade 11 and the resilient blade 12 is retained in position by pin 14, pin 13 and boss 1f. The operation remains as described with reference to FIG. 1. When the brush-and-spring unit is to be changed, the resilient blade 12 is pressed in order to disengage its tooth from pin 14, the unit 11–12 is pulled upwardly and swung about pin 13 (position of FIG. 9). The brush-and-spring unit 3–6–7–9 may then be freely removed through the outer end of the brush-holder casing, the spring loop 7a passing through the open-ended opening or slot 1d. A fresh brush-and-spring unit is thereafter introduced into the casing 1, blades 11 and 12 are swung back as indicated by the arrow in FIG. 9 and they are pushed inwardly, sleeve 5 pushing in turn the spring loop 7a which rolls against the adjacent side of brush 3. When the position of FIG. 8 is reached, the resilient blade 12 becomes automatically locked under the action of its own resiliency and it retains blade 11.

Although the invention has been described with reference to a single brush it is obvious that it may be applied to the case of twin brushes or of brush-holders comprising any number of brushes disposed in parallel or in tandem.

I claim:

1. A brush holder device for a rotary electric machine having a current collecting member which rotates about an axis, said device comprising:
   a casing having an inner end and an outer end with said inner end being disposed adjacent said rotating member, said casing being formed with brush guiding means extending between said outer end and said inner end along a longitudinal guiding axis;
   a brush slidably disposed in said guiding means to electrically cooperate with said rotating member, said brush having an inner end and an outer end with said inner end engaging said rotating member;
   a spring acting on said brush to urge the inner end thereof against said rotating member, said spring comprising a resilient self-coiling ribbon having an inner end and an outer end with said outer end being secured to the outer end of said brush, and said spring including a substantially straight uncoiled portion extending along a side surface of said brush in said guiding means in a plane substantially parallel to the axis of said rotating member and further including a substantially circular coiled portion disposed adjacent said inner end of said casing;
   and means carried by said casing near the inner end thereof to form a resting surface against which said coiled portion of said spring bears so that the spring exerts pressure against said resting surface and said side surface of the brush near its inner end by virtue of the self-coiling reaction of said spring whereby the outer end of the spring urges said outer end of said brush towards said inner end of said casing, said resting surface being disposed at such an angle to the longitudinal axis of said guiding means as to provide a lateral component of force which deflects said coiled portion against said side surface of the brush in the vicinity of said inner end of said casing.

2. In a brush-holder device as claimed in claim 1, said outer end of said spring being secured to the outer end of said brush in a non-detachable manner, with said brush and spring thus forming a single interchangeable unit.

3. In a brush-holder device as claimed in claim 1, said resting surface being covered with an insulating and frictionreducing layer.

4. In a brush-holder device as claimed in claim 1, said guiding means including guiding walls, and said resting surface comprising a substantially rigid blade supported by said casing and so shaped as to define in combination with said brush a recessed space to receive said coiled portion of said spring, one of said walls having an opening adjacent said space for passage of said coiled portion.

5. In a brush-holder device as claimed in claim 1, said resting surface means being part of a removable unit adapted to be introduced into said brush-holder casing through the outer end thereof, said casing including means to retain said unit in operative position, and said brush guiding means including guiding walls and one of said walls having an opening to receive said coiled portion of said spring.

6. In a brush-holder device as claimed in claim 5, said removable unit further comprising a lateral resilient blade secured to a rigid blade carrying said resting surface, and the resilient blade being so shaped as to form a spring clip, said retaining means comprising a stop carried by said casing to removably retain said resilient blade in operative position, and said casing also having abutment means disposed adjacent said removable unit to support it against displacement by said spring.

7. In a brush-holder as claimed in claim 6, said removable unit being in the form of a V having a first branch comprising said substantially rigid blade and a second branch comprising said resilient blade, said abutment means including a pin carried by said casing and disposed between said branches adjacent the outer end of said casing to retain said removable unit pivotally attached to said casing when it has been pulled outwardly therefrom and rocked laterally to disengage said spring.

* * * * *